(12) United States Patent
Matthews et al.

(10) Patent No.: US 7,937,436 B2
(45) Date of Patent: May 3, 2011

(54) VALIDATING ROUTING OF CLIENT REQUESTS TO APPROPRIATE SERVERS HOSTING SPECIFIC STATEFUL WEB SERVICE INSTANCES

(75) Inventors: Daniel James Matthews, Hampshire (GB); Ian Robinson, Hants (GB)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 11/752,327

(22) Filed: May 23, 2007

(65) Prior Publication Data
US 2008/0060082 A1    Mar. 6, 2008

(30) Foreign Application Priority Data
May 24, 2006   (GB) .................................. 0610302.2

(51) Int. Cl.
*H04L 9/32* (2006.01)
(52) U.S. Cl. .......... 709/203; 709/225; 709/231; 705/26; 705/67
(58) Field of Classification Search .................. 709/220, 709/203
See application file for complete search history.

(56) References Cited

U.S. PATENT DOCUMENTS

| | | | |
|---|---|---|---|
| 6,606,708 B1 * | 8/2003 | Devine et al. ..................... | 726/8 |
| 2002/0013764 A1 | 1/2002 | Karna | |
| 2002/0052968 A1 * | 5/2002 | Bonefas et al. ............... | 709/231 |
| 2003/0023957 A1 | 1/2003 | Bau, III et al. | |
| 2005/0015643 A1 | 1/2005 | Davis et al. | |
| 2005/0246292 A1 * | 11/2005 | Sarcanin ......................... | 705/67 |
| 2006/0143293 A1 * | 6/2006 | Freedman ..................... | 709/225 |

FOREIGN PATENT DOCUMENTS

CN           1505329 A        6/2004

* cited by examiner

*Primary Examiner* — Wing F Chan
*Assistant Examiner* — Tesfay Yohannes
(74) *Attorney, Agent, or Firm* — Jordan IP Law, PC

(57) ABSTRACT

A method, apparatus and computer program for validating that a client's request has been routed to an appropriate server hosting a specific stateful web service instance in a system comprising a plurality of stateful web service instances. The specific stateful web service instance is one which has required state data for processing the client's request. A request is received for processing by a web service instance. Any identity data is extracted from the request. The identity data uniquely identifies the required state data and the identity of the target server that hosts that state data. It is then determined whether the target server identity matches that of the server that has received the client's request and responsive to a negative determination, a routing failure is reported.

21 Claims, 5 Drawing Sheets

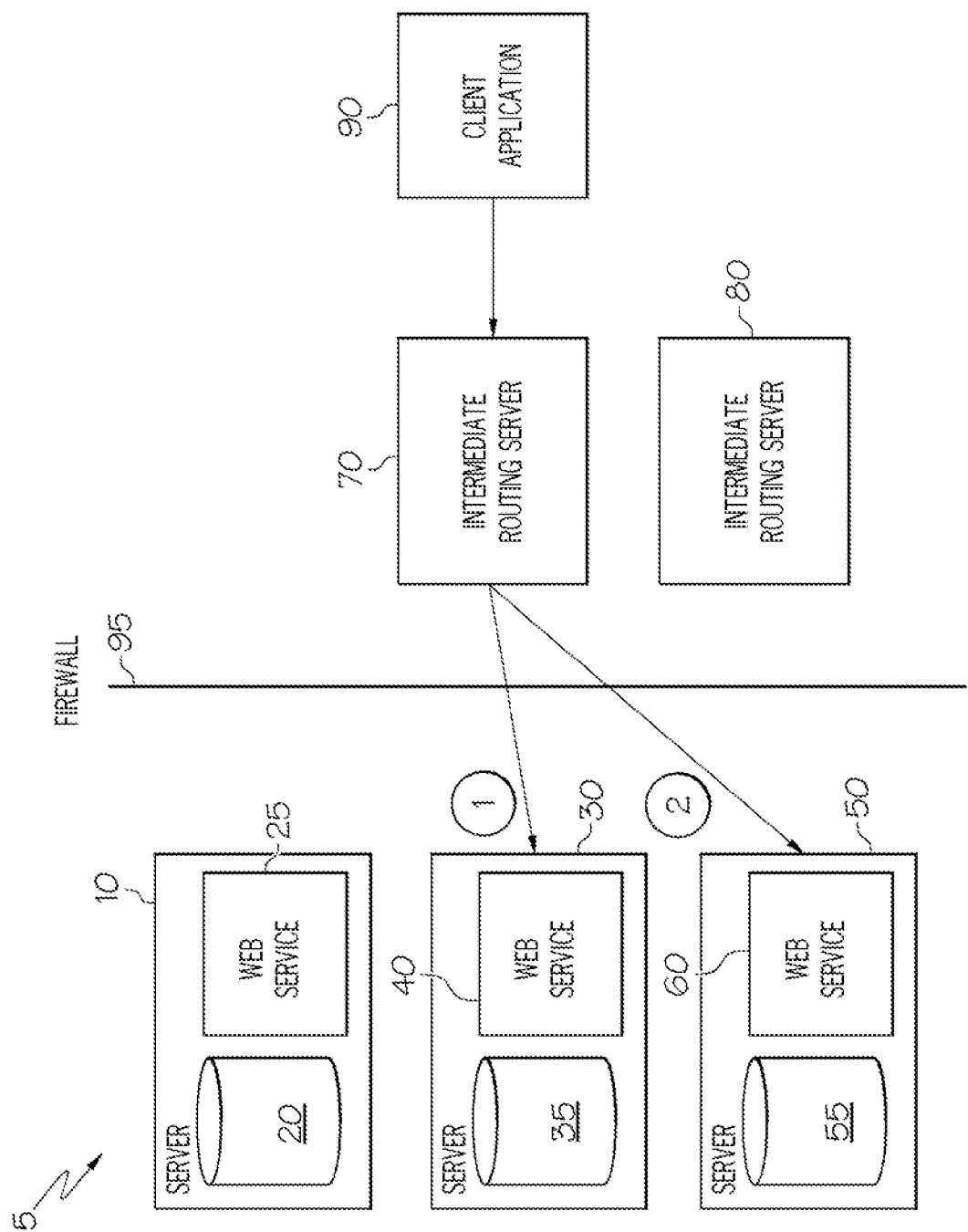

VALIDATING ROUTING OF CLIENT REQUESTS TO APPROPRIATE SERVERS HOSTING SPECIFIC STATEFUL WEB SERVICE INSTANCES

FIELD OF THE INVENTION

The invention relates to web services, and more particularly to validating that a web service request has reached the correct target server.

BACKGROUND

Web services are typically stateless. So if a web service request is delivered to a target that is capable of processing the request, then the request is deemed to have been delivered correctly. If the target is not found or is incapable of processing the request then an error will occur and be sent back to the requester. In these cases, validation that a request has been correctly routed is trivial since any target that exists and is capable of processing the request is considered valid.

However, not all web services are stateless. Making requests to a stateful web service requires an addressing mechanism. Web service requests addressed to stateful web services must not merely be delivered to a web service instance capable of processing the request, but also to the specific web service instance to which the request was addressed. The simplest way to address a stateful web service is a direct addressing system that contains the unique address of the stateful web service itself. Such direct addressing is generally reliable, however it is limited in certain capabilities such as high-availability.

Indirect addressing is commonly required whenever an intermediate node (or nodes) take part in the routing of a request. An intermediate node for the purposes of this discussion is an entity which retargets or reroutes the request. For example, a node could be a separate process, such as a Web server, or indeed a component, for example routing logic running in the requester. Routing code is commonly used for workload management and highly available functionality. Web servers and proxy servers are commonly used to support real-world system topologies, including the use of firewalls to provide security, whereby the address of the target web service is not addressable directly by the client.

Whenever indirect addressing is used, there is an increased possibility that a web service request addressed to a stateful web service will be incorrectly routed to the wrong server. This could be for any number of reasons including but not limited to failover or workload managed relocation of stateful web service instances, incorrect administration and data propagation delays in routing data. In such cases, it is a non-trivial task for user code to distinguish between the cases where, on the one hand, a received request has been wrongly routed to a server that does not host the stateful web service instance and, on the other hand, a received request has been correctly routed to an appropriate server but the stateful web service instance no longer exists.

SUMMARY

Accordingly the invention provides a method for validating that a client's request has been routed to an appropriate server hosting a specific stateful web service instance in a system comprising a plurality of stateful web service instances, the specific stateful web service instance having required state data for processing the client's request, the method comprising: receiving a request for processing by a web service instance; extracting any identity data from the request, the identity data uniquely identifying the required state data and the identity of the target server that hosts the state data; determining whether the target server identity matches that of the server that has received the client's request; and responsive to a negative determination, reporting a routing failure.

The identity data may reference the id of a cluster of servers, each one of which has access to the required state data. The identity data may reference a highly available service which keeps track of where the required state data is located.

In one embodiment, responsive to determining that the request does not include any identity data, the request is passed on to the web service instance.

In one embodiment a request is received to create a reference to a stateful web service instance on a specific server or cluster. A reference is then provided that encapsulates the identifier in response to the client's request.

In one embodiment, if it is determined that the target server identity does not match that of the server that has received the client's request, the request is re-routed to a server that hosts the required state data. Other options are however possible, for example an error message may be returned to the requesting client.

In one embodiment, once it has been validated that a request has been correctly routed and if it is determined that the required state data does not exist on the server at which the request has been received, it is possible to recognize that the state data really does not exist within the system. It is then possible to react to this in an application specific manner. This could mean, for example, providing an indication to the client that the stateful web service instance does not exist.

According to another aspect, the invention provides an apparatus for validating that a client's request has been routed to an appropriate server hosting a specific stateful web service instance in a system comprising a plurality of stateful web service instances, the specific stateful web service instance having required state data for processing the client's request, the apparatus comprising: means for receiving a request for processing by a web service instance; means for extracting any identity data from the request, the identity data uniquely identifying the required state data and the identity of the target server that hosts the state data; means for determining whether the target server identity matches that of the server that has received the client's request; and means, responsive to a negative determination, for reporting a routing failure.

According to another aspect, the invention provides a computer program for validating that a client's request has been routed to an appropriate server hosting a specific stateful web service instance in a system comprising a plurality of stateful web service instances, the specific stateful web service instance having required state data for processing the client's request, the computer program comprising program code means adapted to perform the following method steps when said program is run on a computer: receiving a request for processing by a web service instance; extracting any identity data from the request, the identity data uniquely identifying the required state data and the identity of the target server that hosts the state data; determining whether the target server identity matches that of the server that has received the client's request; and responsive to a negative determination, reporting a routing failure.

BRIEF DESCRIPTION OF THE DRAWINGS

A preferred embodiment of the present invention will now be described, by way of example only, and with reference to the following drawings, in which:

FIG. 1 illustrates the environment in which the present invention operates in accordance with a preferred embodiment;

DETAILED DESCRIPTION

Figure 2A:
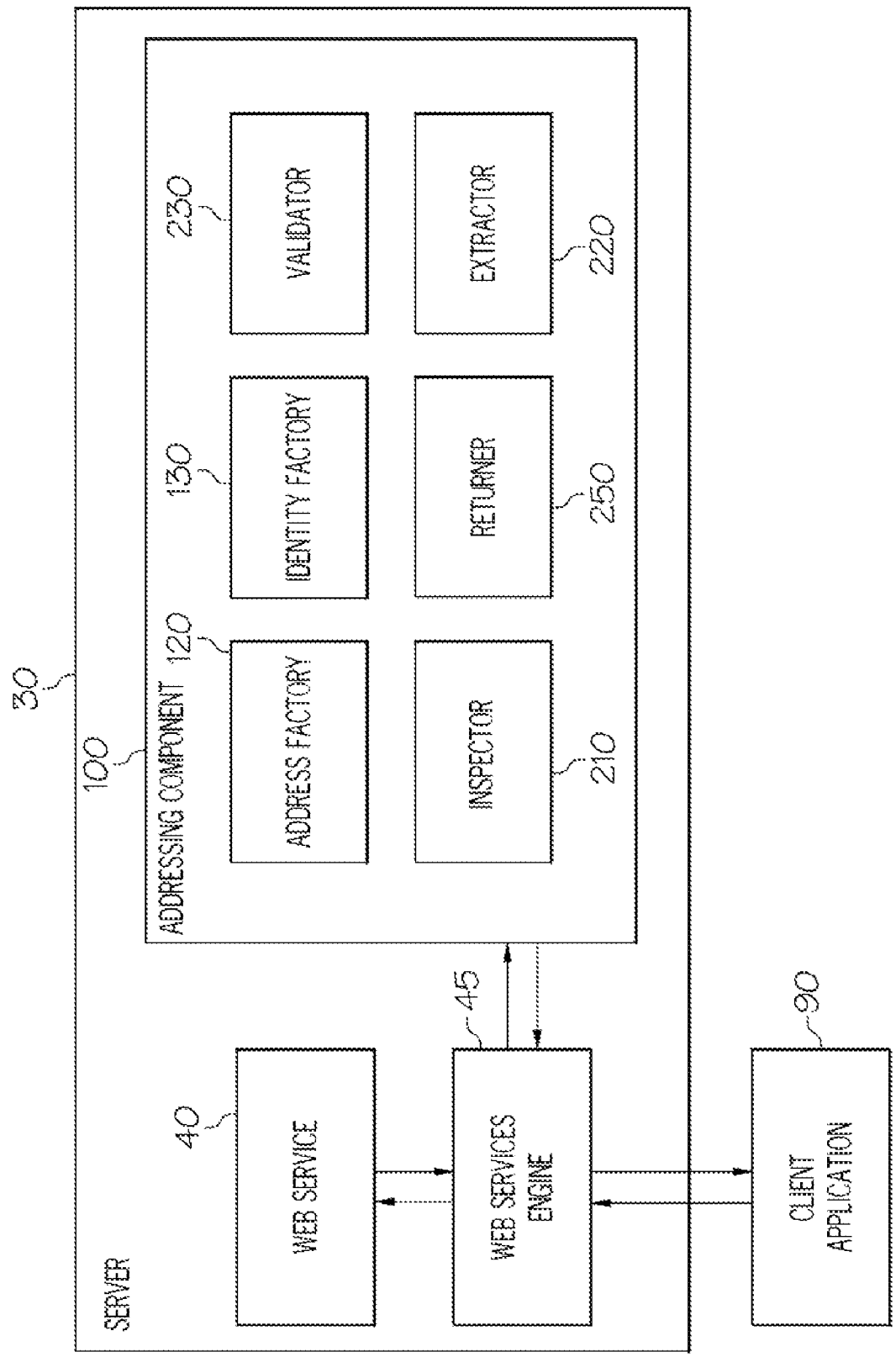
FIGS. 2a and 2b show the componentry of the present invention in accordance with a preferred embodiment.

There is described a solution in which an Addressing Component verifies that a web service request has reached the correct target server and enables incorrectly routed requests to be processed in a distinct fashion from requests that are directed at web service instances that no longer exist.

FIG. 1 illustrates the environment in which the present invention operates in accordance with a preferred embodiment. A plurality of servers 10, 30, 50 (which may be behind a firewall 95) each host an instance 25, 40, 60 of the same web service (e.g. a banking application). Multiple servers may be used, for example, to spread the workload in a busy system. With stateful web services, each web service instance has access to some state data 20, 35, 55 and such state data is used by each instance to process requests from a client application 90. Client application 90's requests reach the server cluster 5 via one or more intermediate routing servers 70, 80. Each request may not go via the same intermediate routing server. Such servers may contain a workload routing component which routes the request to a web service instance on the basis of the current workload being experienced by each web service instance. Once a client has a reference to a stateful web service instance then the workload balancing may be constrained to route subsequent requests to the same server on which the stateful web service instance is hosted, if the state data associated with that stateful instance is not replicated across all the servers in the cluster. It may sometimes be necessary for the workload management system to "move" stateful web service instances from one server to another in order to maintain evenly-distributed workloads. In a distributed environment, in which there is always some latency, the workload router may get out of step with the actual location of a stateful web service instance. Consequently the client application's first request may be routed to server 10, on which a stateful web service instance is created, but the web service instance may subsequently be moved to server 30. This can prove problematic if subsequent requests from the client remain directed at server 10 where the state data no longer exists if the state data is not replicated between servers. When the subsequent request is received at server 10, the target web service instance does not exist in that server—that is, the state data associated with the target web service instance is not present on server 10. A response to the client indicating that the web service instance does not exist would be incorrect and may lead to incorrect client behavior.

The same problem would occur if the web service instance remains on a single server throughout its lifetime but the routing server does not constrain its workload distribution with an affinity to the server that hosts the stateful web service instance (as shown in FIG. 1).

In general, this problem can occur whenever a routing component directs a request intended for a stateful web service instance to the wrong server.

Figure 2B:
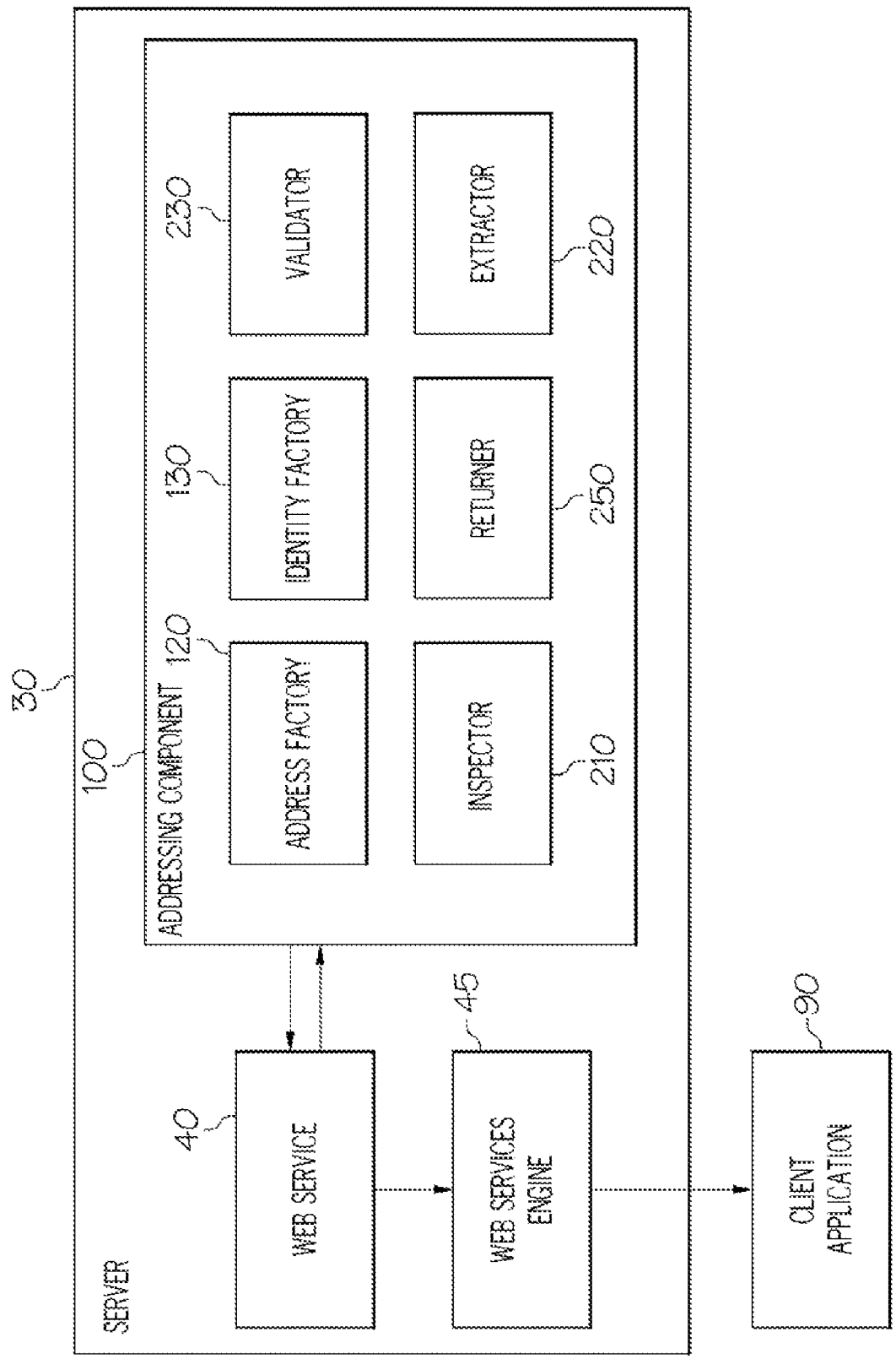
Figure 3A:
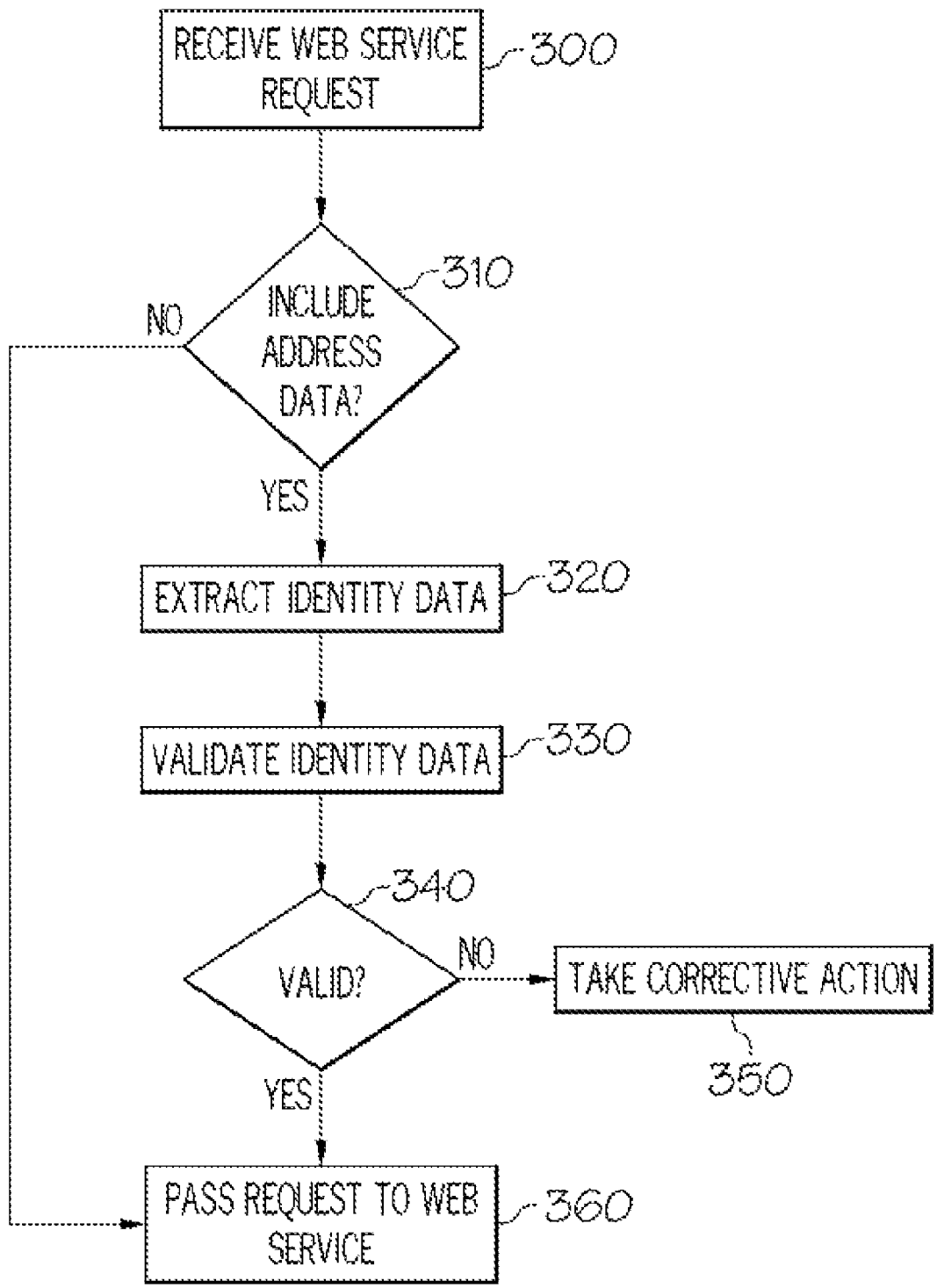
FIGS. 3a and 3b illustrate the processing of the present invention in accordance with a preferred embodiment.
Figure 3B:
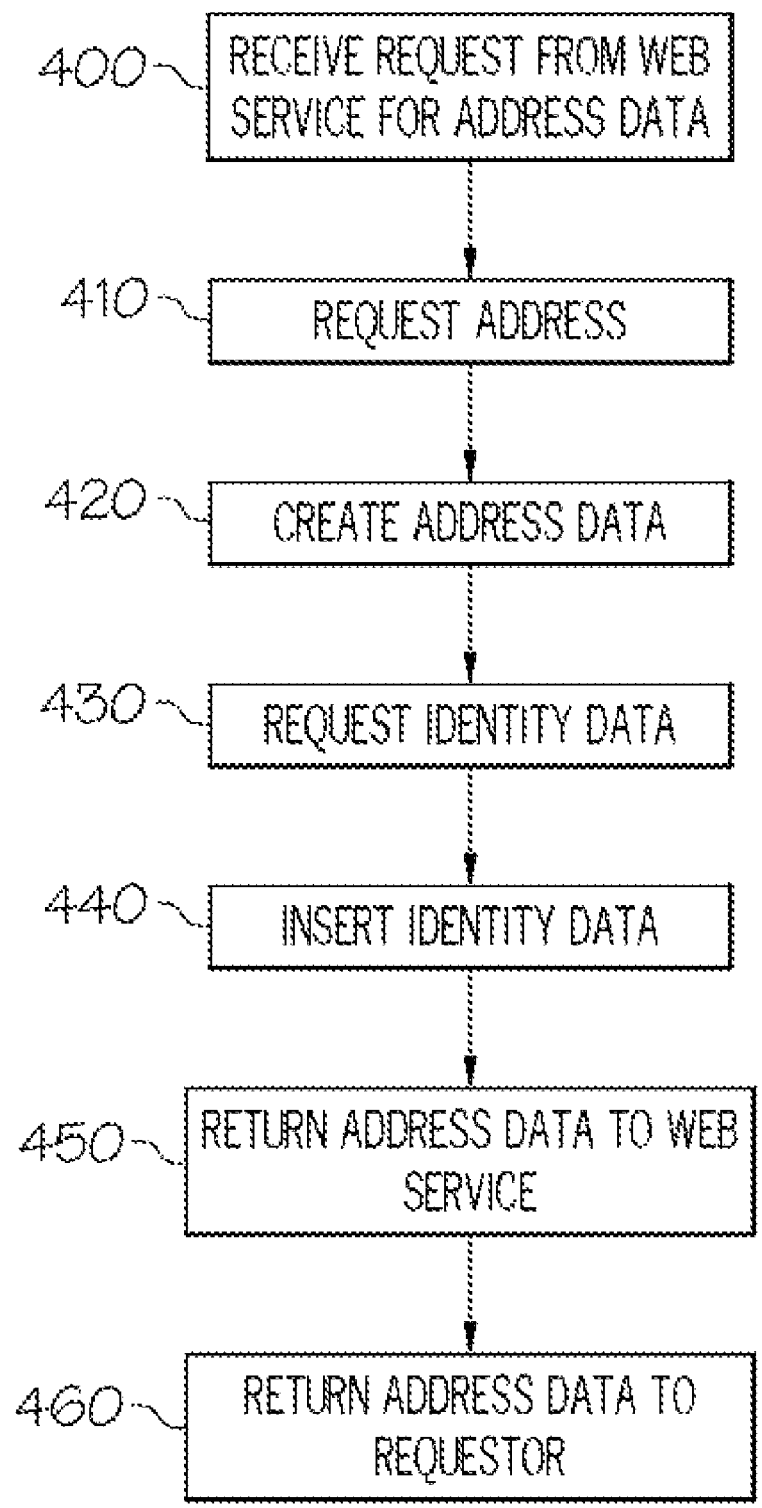

The solution to the problem discussed above is illustrated with reference to FIGS. 2a, 2b, 3a and 3b. FIGS. 2a and 2b shows the componentry of the preferred embodiment, whilst FIGS. 3a and 3b illustrate the processing of the present invention in accordance with the preferred embodiment. The figures should be read in conjunction with one another.

FIGS. 2a and 3a are referenced first. These deal with the validation of a client's web service request to verify that the correct server (which should have the necessary stateful web service) has received the request. Client application 90 requests a web service. The client application's request is routed by an intermediate routing server (not shown) to server 30 and consequently web service instance 40. Web Services Engine 45 receives the request at step 300. The Web Services Engine 45 preferably always passes such requests through to Addressing Component 100. Inspector component 210 within the Addressing Component determines whether the client application's request includes address data at step 310. Address data is used to subsequently confirm that the correct server has been targeted and to select a particular web service instance on that server.

The first time a request is received from the client application 90, it does not contain any address data. The Addressing Component (Returner 250) instructs the Web Services Engine 45 to pass the request through to the web service 40 (step 360). The web service may deem it appropriate to request address data for use by the client in future requests to the same web service instance. The creation of address data will be discussed later with reference to FIGS. 2b and 3b.

If it is determined by the Inspector component 210 at step 310 that the request does contain address data then Extractor component 220 extracts the address data from the request at step 320 and then uses identity data within the address data to validate at step 330 whether the request has been routed to the correct target server and, if so, which web service instance on the target server should handle the request (Validator 230). Such identity data uniquely identifies the target server identity and the state data (information) associated with the web services instance that has been the subject of previous related requests from the client. Such state data has been built up as a result of such previous requests. The form that this identifier will take is partly dependent upon the type of web service:

i) The web service may be what is known as "fragile". In this case, it is only acceptable to use the state data that exists on the particular server holding the web service instance at which the client's first request was routed. Thus the identity data preferably includes the server's id;

ii) In some cases, state data is shared between a cluster of servers and thus any web service instance within the relevant cluster will have access to the same state data. Consequently, the identity data preferably includes a cluster id; and iii) Sometimes a web service is classified as a "highly available" (HA) web service. This means that it is managed by an HA service which keeps track, of which server the web service instance and its associated state data resides. When a server fails, the HA service moves the web service instance and its state data to another server and updates its tracking database. For an HA web service, the identity data preferably includes the form of an id which the HA service will recognize and use to determine whether a server receiving a request including the identity data is the one which maps to the HA id.

The web service itself will preferably have indicated to the Addressing Component into which category it fails when it requested that address data including such identity information is created (see later).

Note that the examples given above are for explanatory purposes only, and are in no way meant as limitations of the invention.

Validator component 230 may determine that the identity data contains a cluster id. This cluster id is then compared with the cluster id of the cluster in which server 30 sits. If the two match, then the request is determined to have been correctly routed. Equally, the Validator component 230 may determine that the identity data relates to an HA id, in which case an associated HA service is asked using the HA id whether the request has been correctly routed.

Thus the test at step 340 either equates to true or false. If the request has been correctly routed, then the Web Services Engine 45 is told by Returner component 250 to pass the request through to the web service instance for processing (step 360). If this is not the case, then corrective action is taken (step 350). This could mean returning an error message from the Addressing Component 100 to client application 90 via the Web Services Engine 45 or the Addressing Component 100 could take it upon itself to reroute the request. In another embodiment, an error message is returned by the Addressing Component 100 but the client application 90 does not receive this. Rather an intermediate node may take it upon itself to reroute the request. It will be appreciated however that this is by way of example only and is not meant to comprise an exhaustive list.

As indicated above, the client's request may not contain any address data. Thus the web service instance may request that such address data is created. FIGS. 2b and 3b are concerned with this part of the process.

The web service instance requests that address data is created by Addressing Component 100. At step 400 the request is received and passed onto Address Factory 120 in order to request an address (step 410). The Address Factory 120 creates address data for addressing the web service instance (step 420). The Address Factory 120 then requests from the Identity Factory 130 identity data which uniquely identifies the server which the client has targeted (step 430). The Address Factory 120 then inserts the identity data returned from the Identity Factory into the address data at step 440.

The address data is then returned by Returner 250 to the web service at step 450. The address data is then returned to the application 90 (step 355).

The next time a request is received by web service 40 from client application 90, the Inspector component 210 determines at step 310 that the request does include address data and can use the identity data within such address data to validate that the request has been correctly routed (FIG. 3a).

To summarize, the present invention provides a mechanism for validating that a web services request has been routed at the correct target server hosting the stateful web service instance. Via this mechanism it is possible to distinguish between the cases:

1) a received request has been wrongly routed to a server that does not host the stateful web service instance; and 2) a received request has been correctly routed to an appropriate server but the stateful web service instance no longer exists.

The solution is applicable to any addressing system whereby properties of an address are included in requests made to that address and available at the target. WS-Addressing is one such example.

WS-Addressing specifies an EndpointReference (EPR) as an address to a web service. This consists of a single mandatory Address URI and zero or more ReferenceParameters. When a web service request is made targeting an EndpointReference, the ReferenceParameters of the EndpointReference are available in the request (in the SOAP-Header). This is independent of the transport used e.g. SOAP/HTTP or SOAP/JMS. When WS-Addressing creates the EndpointReference, a well-known ReferenceParameter is to be added by the WS-Addressing component that represents a topological entity in the system, in this case the identity data. The type of this identity is determined by the type of EndpointReference e.g. fragile, WorkLoadManageable or Highly Available. The identity in each of these cases will represent a constant one-to-one mapping to a particular physical server, a mapping to a logical group of servers, or a one-to-one mapping to a virtual single entity which may relocate from one physical server to another, respectively.

When the target system receives an inbound web service request, the WS-Addressing component of the target system inspects the request's SOAP Header for the well-known ReferenceParameter (now being used as identity data) and extracts its value. It then validates that the identity data in the request is compatible with the target.

What is claimed is:

1. A computer implemented method for routing a request, the method comprising:
    receiving a request from a client application, the request to be processed by a stateful web service instance, the stateful web service instance having state data, the state data used by the stateful web service instance to process the request;
    extracting identity information from the request, the identity information including an identity of a first server that hosts the stateful web service instance; and
    reporting a routing failure based on the identity of the first server not corresponding to an identity of a server that received the request.

2. The method of claim 1, wherein the identity information includes an identity of a cluster of servers, wherein each of the servers in the cluster of servers has access to the state data.

3. The method of claim 1, wherein the identity information includes identity of a service which keeps track of a location of the first server and its state data.

4. The method of claim 1, further comprising:
    responsive to determining that the request does not include identity information, passing the request on to the stateful web service instance.

5. The method of claim 1, further comprising:
    receiving a second request to create a reference to the stateful web service instance on a second server or a cluster associated with the second server; and
    providing the reference to the stateful web service instance in response to the request, wherein the reference encapsulates an identity of the second server or of the cluster associated with the second server.

6. The method of claim 1, further comprising:
    based on the identity of the first server not corresponding to the identity of the server that received the request, re-routing the request to a third server that has access to the state data.

7. The method of claim 1, further comprising:
    responsive to determining that the identity of the first server does not correspond to the identity of the server that received the request,
        recognizing that the state data does not exist in the server that received the request.

8. The method of claim 7, further comprising:
    providing an indication that the stateful web service instance does not exist in the server that received the request.

9. An apparatus for validating whether a request has been routed to a target server hosting a stateful web service instance, the stateful web service-instance having state data for processing the request, the apparatus comprising:
    means for receiving the request to be processed by the stateful web service instance;

means for extracting identity information from the request, the identity information uniquely identifying the required state data and an identity of the target server that hosts the stateful web service instance;

means for determining whether the identity of the target server matches that of an identify of a server that received the request; and means for reporting a routing failure based on the identity of the target server not matching the identity of the server that received the request.

10. The apparatus of claim 9, wherein the identity information references an identification of a cluster of servers, each one of the servers in the cluster has access to the state data.

11. The apparatus of claim 9, wherein the identity information references a service which keeps track of where the state data is located.

12. The apparatus of claim 9, flirt her comprising:
means for passing the request on to the web service instance responsive to determining that the request does not include the identity information.

13. The apparatus of claim 9, further comprising:
means for receiving a request to create a reference to the stateful web service instance on a specific server or cluster of servers; and
means for providing the reference in response to the request, wherein the reference includes an identity of the specific server or the cluster of servers.

14. The apparatus of claim 9, further comprising:
means for re-routing the request to a server that hosts the stateful web service instance, based on the routing failure.

15. The apparatus of claim 9, further comprising:
means for recognizing that the state data does not exist in the server that received the request, based on the routing failure.

16. The apparatus of claim 15, further comprising:
means for providing an indication that the stateful web service instance does not exist in the server that received the request.

17. A computer program product for validating that a request has been routed to an appropriate server hosting a specific stateful web service instance in a system comprising a plurality of stateful web service instances, the specific stateful web service instance having required state data for processing the request, the computer program product comprising a non-transitory computer readable storage medium having computer usable program code tangibly embodied therewith, the non-transitory computer readable storage medium comprising:

computer usable program code configured to receive the request for processing by the stateful web service instance;

computer usable program code configured to extract identity data from the request, the identity data uniquely identifying the state data and an identity of a target server that hosts the stateful web service instance;

computer usable program code configured to determine whether the identity of the target server matches an identity of server that received the request; and computer usable program code configured to, responsive to the identity of the target server not matching the identity of the server that received the request, report a routing failure.

18. The computer program product of claim 17, wherein the identity data references an identification of a cluster of servers, each one of which has access to the state data.

19. The computer program product of claim 17, wherein the identity data references a highly available service which keeps track of where the required state data is located.

20. The computer program product of claim 17, further comprising:
computer usable program code configured to, responsive to determining that the request does not include the identity data, pass the request on to the stateful web service instance.

21. The method of claim 1, wherein the state data has been built up as a result of previous request.

* * * * *